United States Patent [19]

Eltgen

[11] Patent Number: 4,500,293
[45] Date of Patent: Feb. 19, 1985

[54] APPARATUS FOR CONVERTING ELECTRIC SIGNALS REPRESENTING DATA INTO A GROUP OF RAISED DOTS CONSTITUTING THE IMAGE OF SAID DATA

[75] Inventor: Jean J. Eltgen, Paris, France

[73] Assignee: Compagnie Internationale pour l'Informatique Cii Honeywell Bull (Societe Anonyme), Paris, France

[21] Appl. No.: 575,293

[22] Filed: Jan. 30, 1984

[30] Foreign Application Priority Data

Feb. 11, 1983 [FR] France ............................... 83 02238

[51] Int. Cl.³ ............................................. G09B 21/02
[52] U.S. Cl. ..................................... 434/114; 340/407
[58] Field of Search ................. 434/114, 113; 340/407

[56] References Cited

U.S. PATENT DOCUMENTS

| | | | |
|---|---|---|---|
| 2,840,440 | 6/1958 | McLaughlin et al. | 360/122 |
| 2,891,324 | 6/1959 | Zuk | 434/114 |
| 3,132,962 | 5/1964 | Seymour | 434/113 |
| 3,276,767 | 10/1966 | Stephan | 270/58 |
| 3,293,617 | 12/1966 | Cottet | 364/200 |
| 3,395,247 | 7/1968 | Fieldgate | 434/114 X |
| 3,510,967 | 5/1970 | King et al. | 434/114 |
| 3,624,772 | 11/1971 | Grunwald | 434/114 X |
| 3,736,672 | 6/1973 | Skewis et al. | 434/114 |
| 4,194,190 | 3/1980 | Bareau | 434/114 X |
| 4,205,120 | 5/1980 | Morizot et al. | 360/136 X |
| 4,321,606 | 3/1982 | Lazzari | 101/91 X |

FOREIGN PATENT DOCUMENTS

2337044 7/1977 France .
2494469 5/1982 France .

OTHER PUBLICATIONS

Xerox Disclosure Journal, vol. 1, No. 5, May 1976, "Braille Points Duplication Method", Gundi Wada.
IBM Technical Disclosure Bulletin, "Ball and Belt Loop Braille Line Display", E. G. Nassimbene, vol. 18, No. 7, Dec. 1975.
Interface Age, "The Inventor's Sketchpad", Roger C. Garrett, vol. 7, No. 3, Mar. 1982, pp. 28–33.

*Primary Examiner*—William H. Grieb
*Attorney, Agent, or Firm*—Kerkam, Stowell, Kondracki & Clarke

[57] ABSTRACT

The invention relates to an apparatus for converting electric signals representing data into a group of raised dots constituting the image of said data and comprises a magnetic recording medium (10) provided at its surface with hollow cells which, after being magnetized by a recording unit (14) are capable of attracting balls (16) contained in a trough (15). The balls attracted in this way are received and held in the cell and form a group of raised dots at the surface of the medium (10). The raised dots can function as reading devices for the blind or for people with poor eyesight or can be used to imprint a tape or other medium.

16 Claims, 13 Drawing Figures

| Fig. 6A |
|---|
| Fig. 6B |
| Fig. 6C |

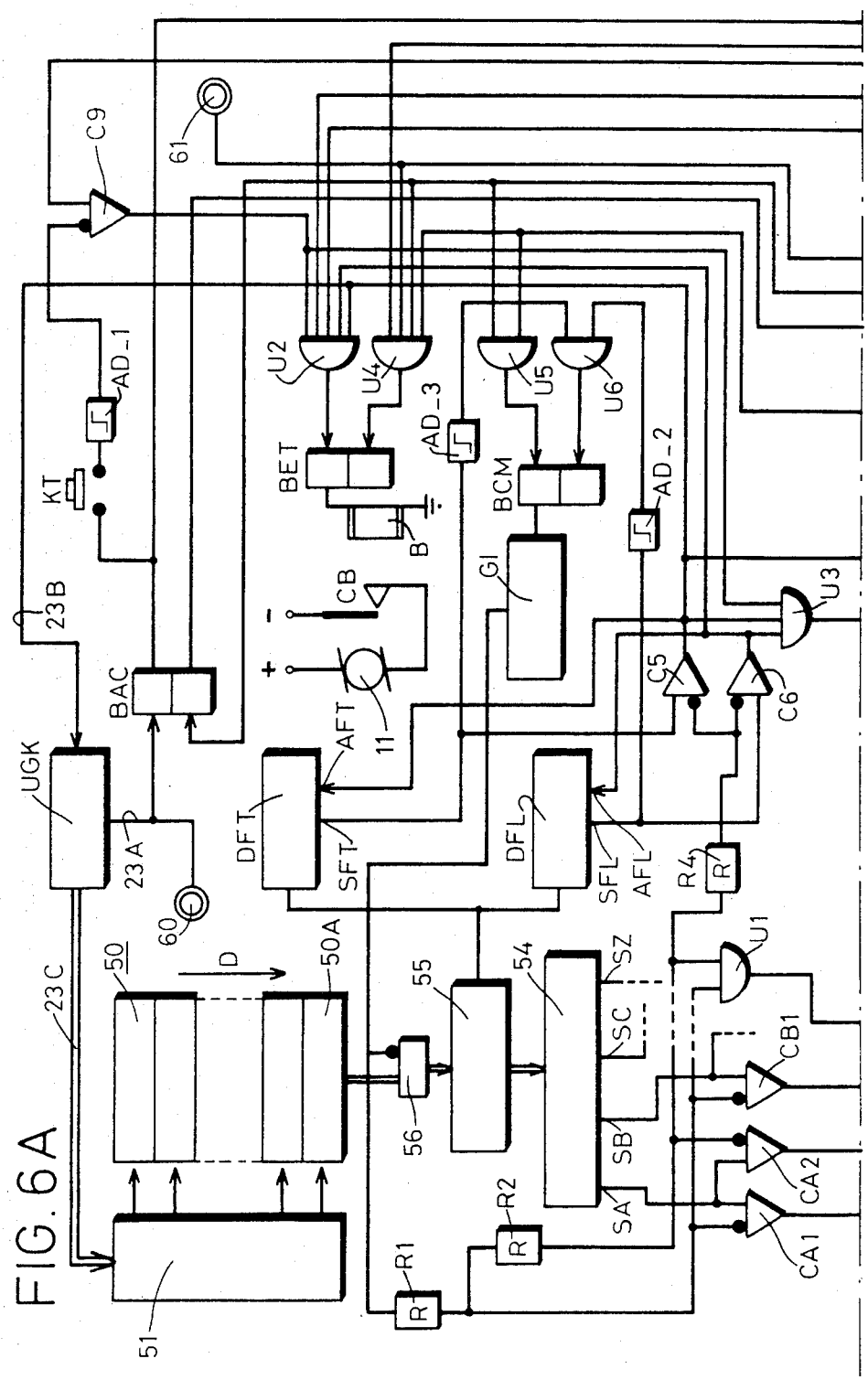

APPARATUS FOR CONVERTING ELECTRIC SIGNALS REPRESENTING DATA INTO A GROUP OF RAISED DOTS CONSTITUTING THE IMAGE OF SAID DATA

BACKGROUND OF THE INVENTION

1. Field of the Invention

The present invention relates to an apparatus for converting electric signals representing data into a coded image of said data comprising a group of raised points or dots. More particularly, though not exclusively, such apparatus finds application in terminal units in which the numerical electric signals emitted by a data processor are converted into groups or raised dots disposed in such a way as to constitute the image of raised symbols intended either to be recorded on a paper tape, or to be identified by touch by running the fingers of one's hand along said symbols. The apparatus is well suited for comprising Braille characters.

2. Description of the Prior Art

Conversion devices are known in the art such as those described and illustrated, for example, in French Pat. Nos. 844,075 and 2,408,879 corresponding to U.S. Pat. No. 4,194,190. Such devices have one or more modules comprising a certain number of tactile pins mounted to slide within a guide block provided with a surface for reading. Each of the pins is capable of moving prependicularly to the reading surface and is fixed such as to take either a raised position in which one of the extremities of the pin juts out from the reading surface, or a retracted position in which the extremity of the pin remains in the guide block and thus does not exceed or jut out from the reading surface.

In a specific embodiment of the invention which as been described in the aforementioned French Pat. No. 2,408,879, corresponding to U.S. Pat. No. 4,194,190 each module has, preferably, six tactile pins which can be placed in a raised position by means of six electromagnets. Each electromagnet is associated with one each of the six pins, the electromagnets are capable of being excited selectively by groups of electric signals emitted by the data processor, the signals of each group being arranged in accordance with a code representing a writing symbol. The tactile pins which have been brought in a raised position in response to the application of a group of signals on said electromagnets, then form on the reading surface a group of raised dots whose arrangement is characteristic of the symbol represented, in coded form, by the group of signals. The configuration presented by this group of raised dots enables one who is blind or has a poor eyesight, but who has learned to recognize the different dot configurations to identify the symbol corresponding to said configuration simply by running his or her fingers along on the reading surface. Nevertheless, in view of the fact that, on the one hand, the higher the number of symbols that can thus be represented, the greater the number of tactile pins needed to represent a symbol and, on the other hand to represent the symbols of the same line of text, it is necessary to have at one's disposal a number of modules at least equal to that of the symbols constituting said lines, the conversion devices of this type usually have a very large number of tactile pins which, in order to be able to function properly, must be adjusted with a high degree of precision in the guide blocks. As a result, the fabrication of this type of conversion device has proved to be both complicated and costly. Furthermore, the tactile pins, which are relatively small in size, are fragile and deteriorate very rapidly despite greasing operations to which they are subjected at regular intervals. Finally, the replacement of worn parts always raises problems, especially because of the small size of these parts and the short distances from which they are separated from each other.

Magnetic printers are known in the art that have a magnetic recording medium provided with a surface capable of being magnetized locally at elementary sites of very small dimensions disposed in rows and columns. The size of these sites never exceeds 250 microns. These machines also have a recording unit disposed near the surface of the recording medium and provided in order, in response to the reception of electric signals to selectively magnetize these sites. A suitable drive is provided to bring about a relative displacement between the recording medium and the recording unit, according to a predetermined direction of movement in order to enable these elementary sites to be selectively magnetized in the course of their movement past the recording unit.

Such printers also have an applicator means which, fitted downstream of the recording unit in relation to the direction of movement, enables particles of a developer to be deposited on the recording medium. These particles, which are magnetically attractable, only subsist on the elementary sites of the medium that have been magnetized, forming a powder image that is then transferred to a sheet of paper. In a variation that has been described in French patent application Ser. No. 2,449,911, corresponding to U.S. Pat. No. 4,321,606, the powder image that has thus been formed is not transferred to a sheet of paper but, constitutes raised characters on the surface of the recording medium. The raised characters, when urged against a sheet of paper, cause the image to be printed on the sheet, the inking being obtained by means of a carbon paper tape inserted between the sheet and the characters.

In order to achieve an average quality of printing, the grains that have been used in this technique for forming raised characters must have size equal to 250 microns. Furthermore, these grains must be coarse in order not to slip on the medium or on the sheet against which they are urged. Finally, in order for these grains to withstand the crushing action exerted thereon during their passage, they must be very hard. In view of these conditions, this technique of forming raised characters cannot be applied to the formation of characters intended to be recognized by touch. Indeed, the developer grains, due to their coarseness, would oppose the sliding of the fingers. In addition, their size, which differs from one grain to another, would not permit the creation on the surface of the recording medium of a uniform or well-marked relief for each character or symbol necessary for recognition by touch of that character or symbol, the relief being at least of the order of 0.5 millimeters. Finally, even if their size were increased, because these grains would be difficult to recognize, this would cause a great fatigue for the person doing the identification of the characters. There also could result scratches on the surface of the recording medium rapidly rendering the latter inoperative.

SUMMARY OF THE INVENTION

The present invention overcomes these drawbacks and proposes an apparatus that enables electric signals to be converted into groups of raised dots, and which is sturdily built and is at the same time inexpensive and relatively easy to fabricate.

More particularly, the invention relates to an apparatus for converting electric signals that represent data into a group of raised dots that constitute the image of the data. This apparatus has a magnetic recording medium provided with a surface that is capable of being magnetized locally at quasi point-shaped sites disposed in rows and columns. A recording unit is placed near the surface and set up in response to the reception of the electrical signals, to selectively magnetize elementary sites of the medium. Drive means is operatively connected and energized to bring about a relative displacement between the recording medium and the recording unit, according to preset direction of movement, so as to enable the elementary sites to be selectively magnetized in the course of their movement past the recording unit. An applicator means is fitted downstream of the recording unit in relation to the direction of movement, in order to deposit on the recording medium particles that are capable of being attracted magnetically. The invention is characterized by the fact that the magnetic recording medium has cells which are each locally established in each of the elementary sites, and by the fact that the particles are spherically shaped. Each of the cells is established in such a manner that the particles which, deposited by the applicator means, subsist in the cells that have been magnetized and jut out on the surface of said recording medium.

The device of the invention is all the more advantageous when used for composing Braille characters. It permits at one and the same time the composition of a large number of lines of characters, while offering the possibility of easily reading, or even printing, the lines on a sheet of paper. Furthermore, the compound lines can easily be erased in order to permit the composition of other lines.

BRIEF DESCRIPTION OF THE DRAWINGS

The foregoing and other objects and advantages of the invention will appear more fully from the following description made in connection with the accompanying drawings, in which:

FIGS. 6A, 6B, 6C, shows, after assembly of FIGS. 6A, 6B and 6C, a detailed logic diagram of the circuits employed for controlling the operation of the apparatus of FIG. 5;

DESCRIPTION OF THE PREFERRED EMBODIMENTS

Figure 1:
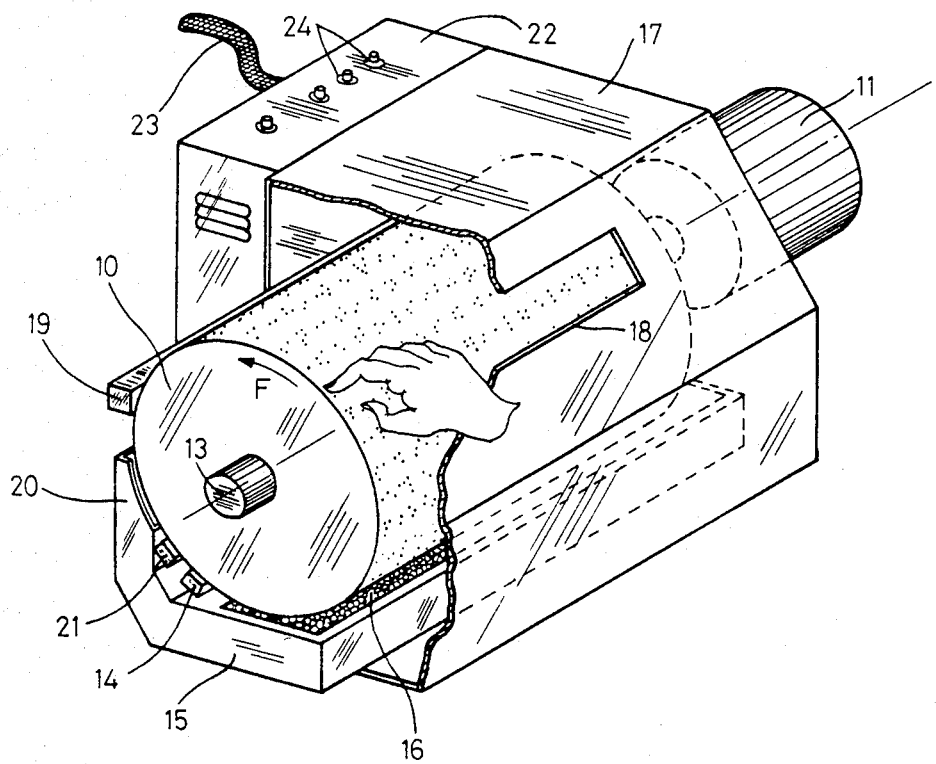
FIG. 1 is a schematic and perspective view, with parts broken away, showing a form of construction of an apparatus for converting electrical signals embodying the principles of the invention.

The apparatus for converting electric signals illustrated in FIG. 1 is a terminal unit whose main constituent elements are enclosed within a case or housing 17. In response to the reception of electric signals that represent characters and emitted by a signal generator (not shown), this apparatus is designed to generate groups of raised dots, each group having an arrangement which is characteristic of a corresponding character.

In the example being described it will be assumed that the characters shown in the form of raised dots are those of the well-known Braille system in which each letter or each sign consists of one or more raised dots distributed within a 6-position grid, said positions of dots being arranged three by three in two columns. However, the invention is not limited to the generation of Braille characters, and in another embodiment, these raised dots may be arranged to form patterns, graphic curves, geometric figures, etc.

Figure 2:
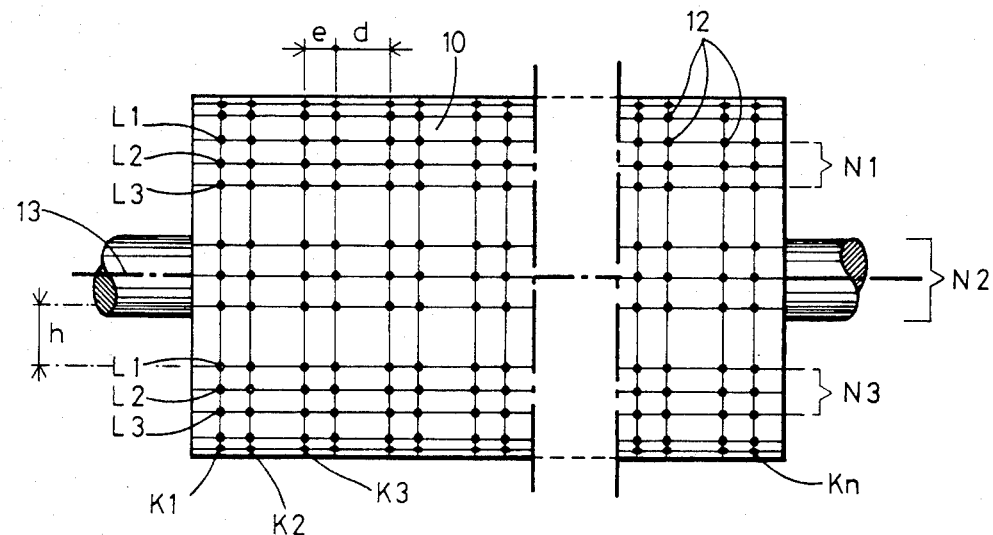
FIG. 2 is a view of a detail of the drum forming part of the conversion mean shown in FIG. 1.

In the embodiment shown in FIGS. 1 and 2, the apparatus for the conversion of electric signals comprises a magnetic recording medium consisting in the example being described of a magnetic drum 10 that can be rotated by an electric motor 11 in the direction illustrated by arrow F. This magnetic drum 10 has on its surface a number of cells 12 made up of dots arranged in groups of six, each of said groups constituting a Braille cell which, as will be seen further below, is used for the formation of a Braille character. The character may represent a letter, a numeral, a punctuation mark or a mathematical symbol.

As can be seen in FIG. 2, the different groups of six cells are arranged such that lines of a character N1, N2, N3, etc... correspond to the different lines of a text to be represented in the Braille code. Each of said lines, correspond to the rows of cells, three being illustrated for each character, such as L1, L2, L3, and each line being parallel to the axis of rotation 13 of the drum 10. In each of these lines, the six cells of each group are, in turn, arranged in two columns, such as K1 and K2, the columns being perpendicular to the direction of the rows and thus forming a matrix of cells. In each group of cells, the spacing e between the cells of a group of cells corresponding to a character, both according to the direction of the rows and according to the direction of the columns, is in the example being described approximately 2 millimeters. The spacing d between the various groups of cells of the same line is substantially equal to 3.75 millimeters. The spacing h between the various lines is approximately 5 millimeters. It is assumed that in the example being described, the magnetic drum 10 has 31 lines numbered consecutively N1, N2, N3. It will be noted, however, that in the interest of clarity of the drawing, the spacings between the various lines, rows and columns illustrated in FIG. 2 have been deliberately exaggerated and are thus not to scale.

Figure 4:
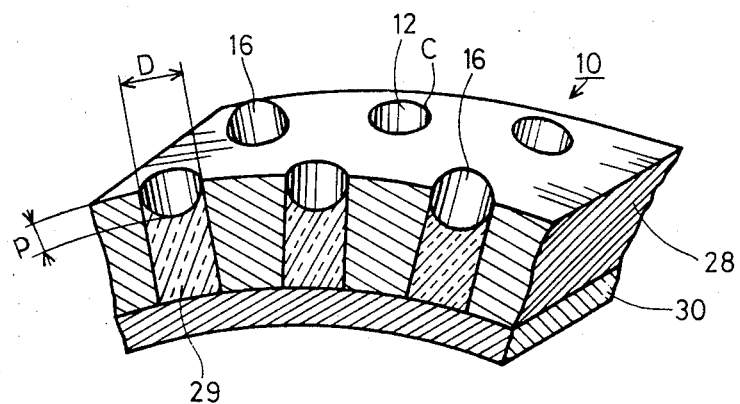
FIG. 4 is a cross-sectional and perspective view of the drum shown in FIG. 2.
Figure 7:
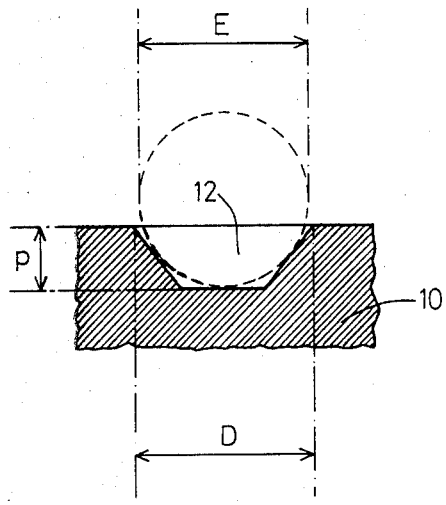
FIG. 7 is an embodiment in which each of the cells of the drum of FIG. 2 can be shown.
Figure 8:
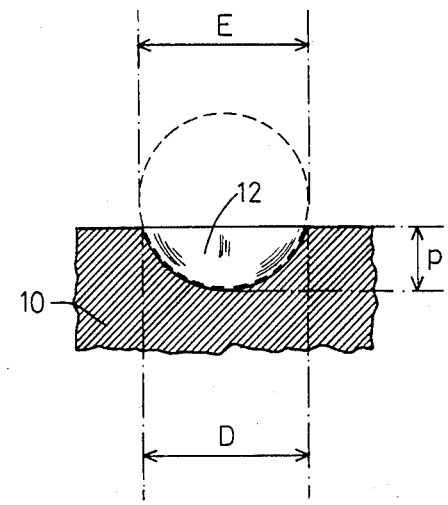
FIG. 8 is a second embodiment in which each of the cells of the drum of FIG. 2 can be shown.
Figure 9:
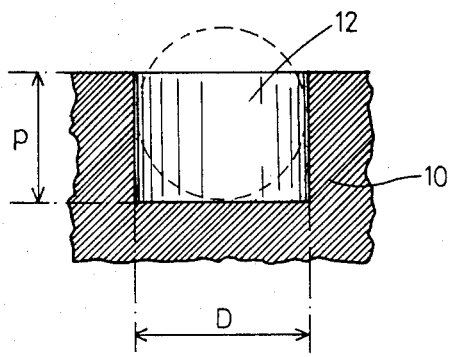
FIG. 9 is a third embodiment in which each of the cells of the drum of FIG. 2 can be shown.
Figure 10:
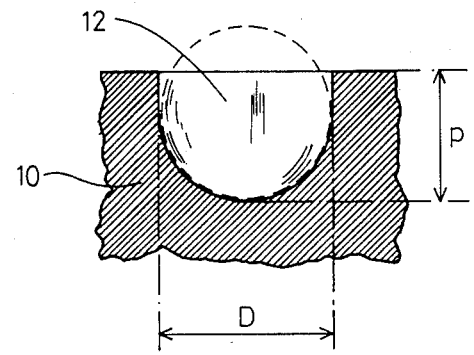
FIG. 10 is a fourth embodiment in which each of the cells of the drum of FIG. 2 can be shown.

Referring to FIG. 4, it will be seen that each of the cells 12 is defined, on the level of the surface of the drum 10, by a circular contour C. In the case of the embodiment illustrated in FIG. 4, each of these cells is shown in the form of a cylindrical cavity whose axis is perpendicular to the drum surface, the bottom of said cylindrical cavity being, preferably, semicylindrical as shown in greater detail in FIG. 10. However, this form of cell is not the only form the cell can take within the bounds of the invention. For example, each of the drum cells may take the form of a cone or a truncated cone, as shown in FIG. 7, a cylindrical cavity with a flat bottom, as shown in FIG. 9, or a spherical cap similar to that illustrated in FIG. 8. It is pointed out however, that in each of these forms of construction each cell is defined on the surface of the drum 10 by a circular contour with a diameter D and a depth p. The depth p of each cell is such that it is at the most equal to ⅔ of said diameter D. In the particular case where the cell assumes the form of a spherical cap (FIG. 8), this depth p is even chosen such as to comply with the double inequation:

$$D/3 \leq p \leq D/2$$

Referring again to FIG. 1, it is seen that the conversion means also comprises a recording unit 14 located near the surface of the magnetic drum 10. The recording unit 14 serves, in response to the reception of electric signals emitted by a signal generator, which will be discussed hereinafter, to selectively magnetize the cells 12 of the drum. As will be apparent from FIG. 6C, the recording unit 14 is made up of a number of magnetic recording heads T-1 to T-n in the same number as that of the columns of cells of the drum 12. The heads are aligned in a row parallel to the axis of rotation 13 of the drum, each of the heads being disposed straight above one of the columns of cells. In the embodiment depicted in FIG. 6C, these heads are of the type described in U.S. Pat. No. 2,840,440. However, it is pointed out that the invention is not restricted to this type of head and that other means forms of magnetic recording means may be used for selectively magnetizing the cells. For example, each head may comprise an electromagnet of the type as that denoted by the reference symbol T1 on FIG. 3, the electromagnet being oriented in such a manner that its axis is perpendicular to the surface of the drum 10.

FIG. 1 shows that the conversion means also comprises an applicator means 15 which, in the example being described, is presented in the form of a trough located near the drum 10 downstream of the recording unit 14 in relation to the direction of rotation of the drum 10. As clearly indicated in the schematic drawing of FIG. 3, applicator means 15 provides a reservoir of small balls 16 in the vicinity of the surface of said drum. The small balls 16 are of identical size and are capable of being magnetically attracted to the cells formed in the drum. In the example being described it will be assumed that each one of said balls consists of a material with a high magnetic permeability such as, for example, soft steel. Furthermore, it is pointed out that the diameter E of said balls is at least one millimeter and each cell 12 cannot receive more than one ball. In the case where the cell takes the form of a cylindrical cavity (FIGS. 4, 9 and 10), the diameter E is slightly less than the diameter D of said cavity, that is to say, that the difference D-E remains between 0.2 and 0.5 millimeter. Thus, in the embodiment illustrated in FIG. 5, in which the diameter D of the cavity is chosen to be, preferably, 2 millimeters, each ball has a diameter of 1.8 millimeter, which enables it to be located in the cell without friction. In the special case where the cell assumes the form of a spherical cap (FIG. 8), the diameter E of each ball has a value obtained by the following equation:

$$E = p + D^2/4p$$

in which p stands for the depth of the cell and D the diameter of the contour (C) which, at the surface of the drum 10, defines said cell. Thus, for example, for a cell of this form whose depth is 0.8 millimeter and its contour has a diameter D of 2.4 millimeters, the diameter of each ball is 2.6 millimeters. Likewise, for a cell of this form whose depth is 1.2 millimeter and its contour has a diameter D of 2.4 millimeters, the diameter of each cell is 2.4 millimeters. In a particularly advantageous embodiment, the diameter of the balls is at the most 3 millimeters, which, taking into account the shape chosen for the cells, permits one to determine the dimensions of these cells according to the indications given hereinabove.

Figure 3:
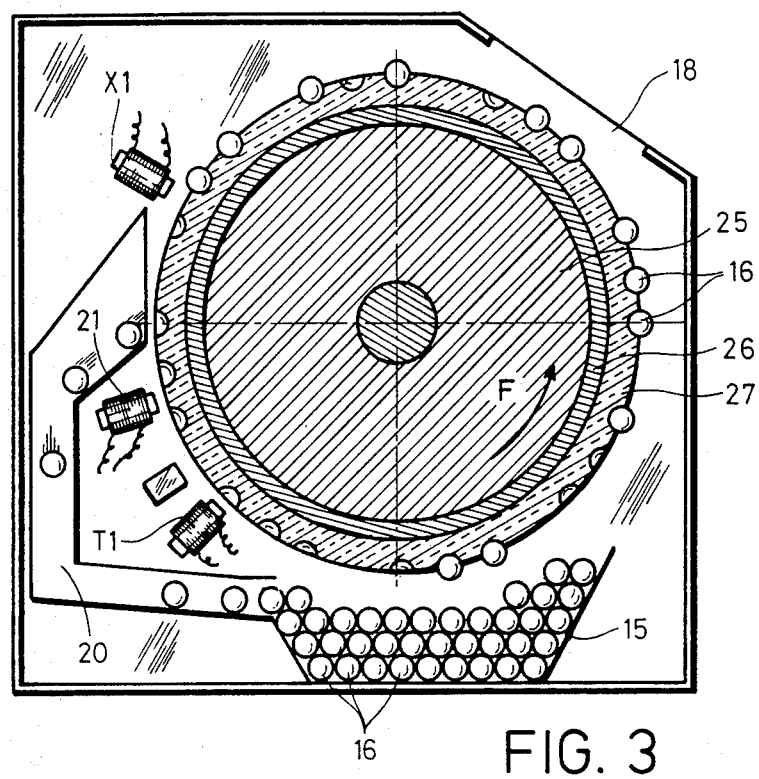
FIG. 3 is a schematic view intended to show in section and on a large scale the main constituent parts of the conversion apparatus of FIG. 1.

As will be understood from a consideration of FIG. 1, the hollow cells 12, which have been magnetized by the recording unit 14 as they move past the trough 15, exert a magnetic attraction on the balls contained in said trough, so that each magnetized cell which has moved past said trough is provided with a ball 16 which, due to its dimensions, juts out on the surface of the drum 10, as illustrated in FIGS. 3 and 4. By contrast, the non-magnetized cells that have moved past the trough 15 remain empty. Thus, thanks to the selective magnetization of the cells which has been effected by the recording unit 14, each of the groups of six cells that has moved past the trough 15 is provided with balls 16 whose distribution, in the six cells of each group, represents a Braille character. Each dot of said character consists of a ball jutting out on the drum surface. The lines of Braille characters which are thus formed on the drum 10 can then be identified by running the fingers of an operator who has learned to recognize these characters. The identification may be effected when the line of characters to be identified has been brought opposite an opening 18 made in the frame 17 of the apparatus. The opening 18 extends along the drum 10 parallel to its axis of rotation 13 and exposes an entire line. Upon completion of this identification, the balls 16 constituting the Braille characters of the identified line can be pulled out of or released from the cells in which they were housed by means of an extraction means 19 (FIG. 1). In the embodiment depicted in FIG. 3, the extraction means 19 comprises a number of electromagnets X-1 to X-n, which may be of the type denoted by the reference symbol X1 in FIG. 3, electromagnets being equal in number as that of the columns of cells and arranged in a row parallel to the axis of rotation 13 of the drum. Each of the electromagnets X-1 to X-n is disposed straight above each of the columns of cells and may be momentarily excited, in a manner which will be explained hereinafter, in order to exert a magnetic attraction on the balls which move past it. The balls 16 which are thus pulled out of the cells 12 can then be subjected to the attractive action of the extraction means 19 by devices known in the prior art (not shown) such as tape transport means, and they then fall into a conduit 20 so that, by gravitational force, they can be returned to the trough 15. The magnetized cells which have been emptied of their balls then move past a demagnetizing erasing means 21 of known construction which ensures the demagnetization of these cells. The cells that have moved past the erasing means are thus again capable of being selectively magnetized when they are placed in front of the recording unit 14.

The operation of the conversion means depicted in FIG. 1 is controlled by an electrical circuit enclosed in a protective housing 22 secured to the case 17. The circuit is connected by means of a cable 23 comprising a plurality of conductors to a signal generator, which will be discussed hereinafter. This housing 24 has on its upper part control elements such as pushbuttons 24 which enable the operator to trigger certain operating sequences, which will be explained in detail in the text.

The magnetic drum 10 forming part of the conversion means illustrated in FIG. 1 may be of the type described and illustrated in French Patent published under No. 2,402,921, corresponding to U.S. Pat. No. 4,205,120 that is to say, as shown in FIG. 3, comprising a cylindrical support 25 made of a material with a high magnetic permeability (such as soft steel) coated with a copper layer 26, which, in turn, is covered with a continuous layer 27 from a magnetic material such as a nickel-cobalt alloy, the thickness of said layer 27 being greater than the depth p of the cells. Thus, in the embodiment being described, the thickness of said layer 27 is of the order of 3 millimeters.

In a particularly advantageous embodiment shown in FIG. 4, this magnetic drum 10 constists of a cylindrical block 28 made from a non-magnetic material such as, for example, aluminum, and provided with a plurality of magnetic elements 29 each locally established underneath one of the cells 12 and each made of a magnetic material with a high residual magnetism. Such a magnetic drum can be made by drilling first, in each of the sites of the cells of the cylindrical block 28 a cylindrical cavity whose axis is perpendicular to the surface of said block, then filling said cavity with a magnetic material with a high residual magnetism while reserving in the upper portion of the cavity the space necessary for the formation of the cell. In the case where, as shown in FIG. 4, the cylindrical block 28 is hollow and where each drilled cavity entirely traverses said block, prior to filling each cavity one can place in said block 28 a second cylindrical block 30 likewise composed of a non-magnetic material, the external diameter of said second cylindrical block 30 being equal, except for the necessary clearance, to the internal diameter of the cylindrical block 28.

Figures 5, 6:
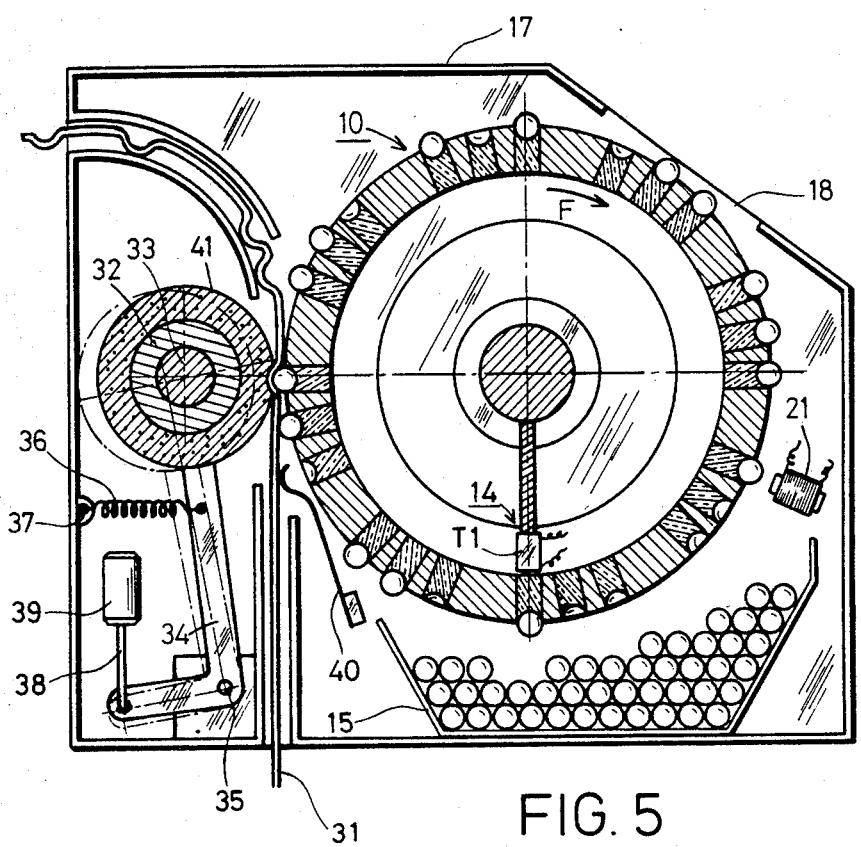
FIG. 5 is a schematic view, in section, showing another form of construction of a conversion means according to the invention.
FIG. 6, comprising

The signal-converting means depicted schematically in FIG. 5 is of the type that is similar to that of FIG. 1. However, it is distinguished from the latter not only by structural details, but also by the fact that, as apparent from FIG. 5, it permits the raised printing of the Braille characters that have been formed on the magnetic drum 10 on a paper tape 21. The drum 10 in this case is of the type illustrated in part in FIG. 4.

In the specific embodiment shown in FIG. 5, one can see that the recording unit 14, only one head T1 of which is visible in the figure, is located inside the hollow drum 10 straight above the applicator means consisting of the trough 15. Moreover, the erasing means 21, which ensures the demagnetization of the cells, is placed near the drum 10 immediately adjacent to the trough 15, but upstream of the recording unit 14, that is to say, at a location where the balls housed in the cells can escape when they cease to be held by magnetic attraction and fall in the trough 15 by gravitational force. This arrangement eliminates the need for a specific extraction means to pull the balls out of the cells of the drum 10.

In the specific embodiment illustrated in FIG. 5, the paper tape 31 to be printed is brought into contact with the drum 10 at a point upstream of the opening 18 with respect to the direction of rotation of the drum. However, one may, without disadvantage, adopt another device in which the paper is brought into contact with the drum a point downstream of the opening 18. The paper tape 31 is brought into contact with the drum 10 by means of a pressure roller 32 mounted on a pin or axle 33 secured to one of the ends of a bent lever 34 flexibly fixed around a fixed pin 35 integral with frame 7. This pressure roller is normally held in a position of rest (shown by the dot-dash line in FIG. 5) under the action of a tension spring 36 stretched, as shown in FIG. 5, between the lever 34 and a fixed point 37 of the frame 17. In this position, the paper tape 31, which is inserted between the drum 10 and the pressure roller 32, is separated from said drum 10 under the action exerted by a spring leaf 40. The pressure roller 32 can, however, be moved toward the drum 10 by means of an electromagnet 38 with an adjustable core which is connected to the other end of the bent lever 34 by means of a rod 39. When said electromagnet 38 is excited by electric means which will be described hereinafter, it acts upon the lever 34 which, pivoting about the axis 35, 11 occupies the position indicated by the solid lines in FIG. 5. In the course of this movement, the pressure roller 32 is moved toward the drum 10, as a result of which the paper tape 31 is firmly urged against said drum.

As shown, in FIG. 5, pressure roller 32 is coated on the outside with a layer 41 of an elastic material, either natural rubber or a synthetic material ordinarily termed elastomer. In the example being described it is assumed that said layer 41 is made of polychloroprene known under the trade name "neoprene" (registered trademark). The hardness of the material constituting the layer 41 must be sufficient to allow each of the balls 16 moving past the roller pressure 32 to produce a raised printing on the paper tape 31 without, however, tearing the paper at the site of said printing. It has been demonstrated that in order to obtain this result, this material must have a Shore hardness of the order of 80. It this elastic material is not sufficiently hard, the hardness can be increased by incorporating certain products, such as plasticizers, during its manufacture.

Figure 6B:
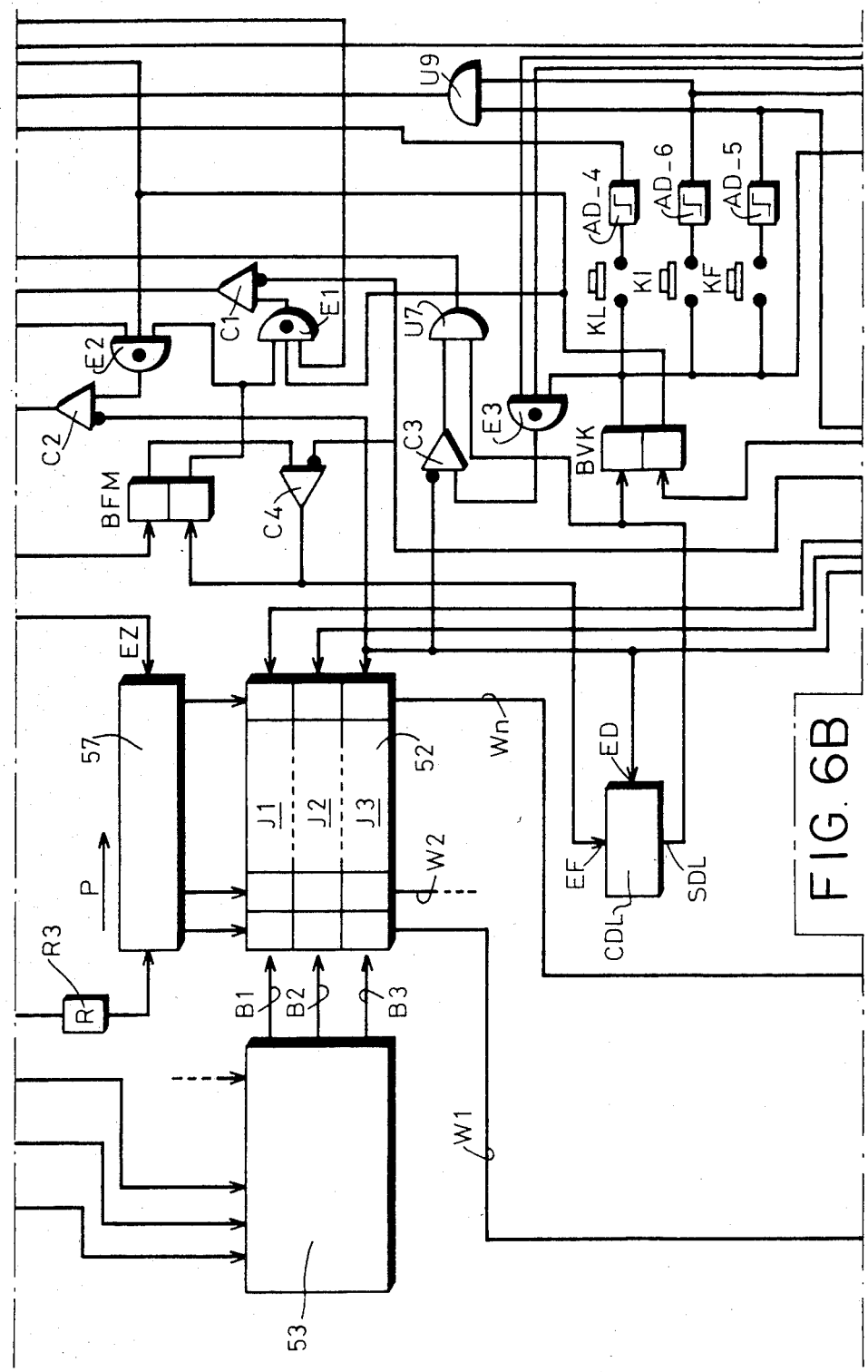
Figure 6C:
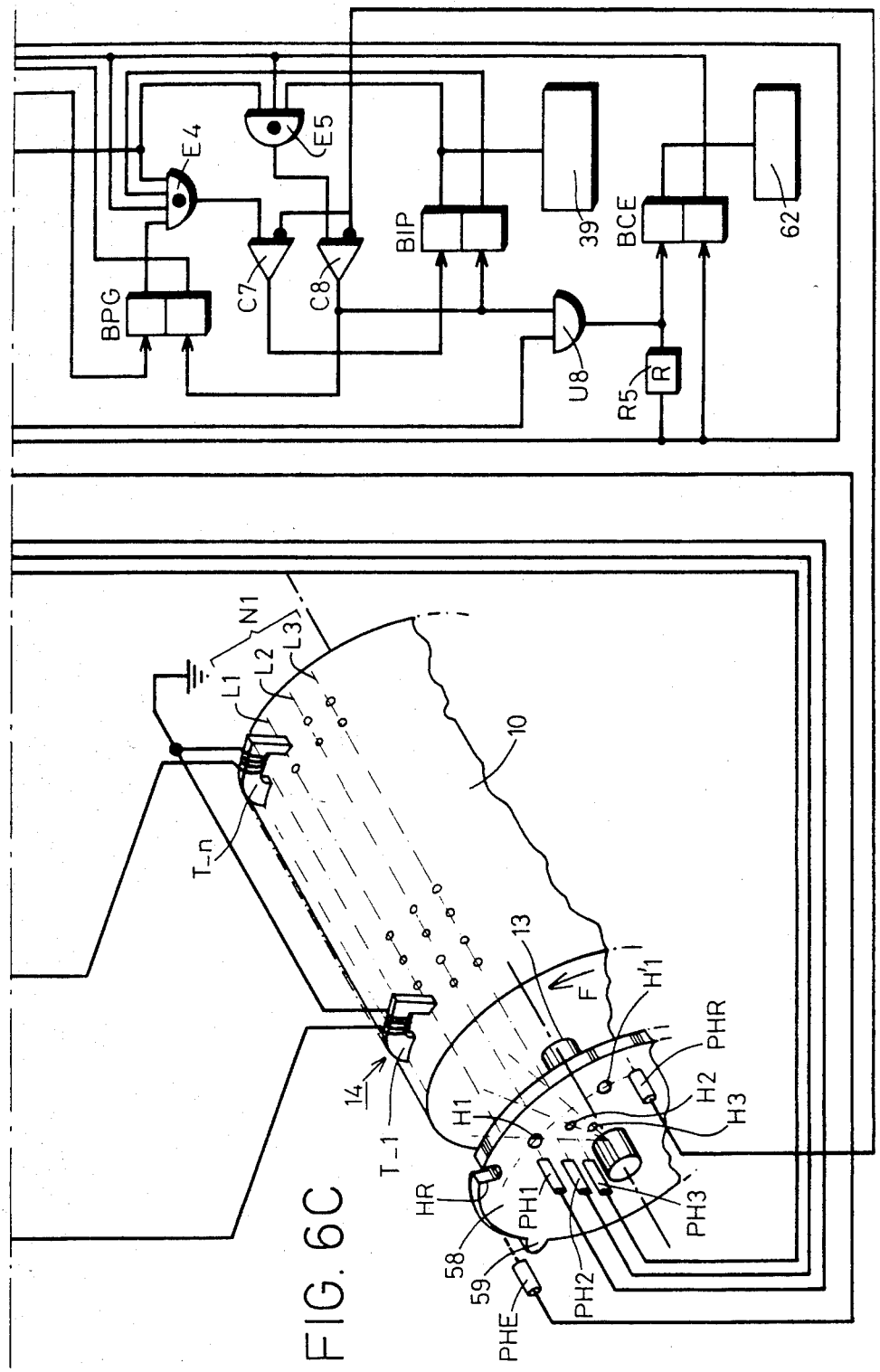

Now, referring to FIGS. 6A, 6B, and 6C, assembled as shown in FIGS. 6, a description will be given of the electric device for controlling the operation of the conversion means shown in FIG. 5. In the diagram of assembled FIGS. 6A, 6B and 6C, the half circles with a point inside represent logic AND circuits, the half circles without a sign represent logic OR circuits, and the triangles represent control circuits. These circuits of known construction are similar to those that have been described and illustrated in French Pat. Nos. 1,342,787 corresponding to U.S. Pat. No. 3,293,617 and 1,387,085 corresponding to U.S. Pat. No. 3,276,767 filed by Compagnie de Machines Bull on July 24, 1962 and Oct. 28, 1963, respectively. In particular, it is recalled that each control circuit comprises two inputs one of which, marked by a point in the figures, is a conditioned input to which are applied electric pulses that are to be transmitted, the other input being a conditioning input to which an electric voltage is applied. It is also recalled that each control circuit transmits one pulse applied to its conditioned input only when its conditioning input is at a positive potential. Bistable elements, generally called trigger circuits, are also shown in the diagram of FIGS. 6A, 6B and 6C. It is recalled that each trigger circuit, such as trigger circuit BAC, for example, shown in FIG. 6A has a "normal" input, a "supplementary" input, a "normal" output, and a "supplementary" output. Finally, it is recalled that each trigger circuit passes to, or remains in, the "1" state each time it receives a pulse through its "normal" input, and passes to, or remains in, the "0" state each time it receives a pulse through its "supplementary" input. It is also assumed that all of the trigger circuits illustrated in FIGS. 6A, 6B and 6C are initially in the "0" state.

It is also pointed out that the circuits making up the control unit shown in FIGS. 6A, 6B and 6C are, preferably, circuits that are characteristic of the conversion means and are lodged in a protective housing similar to that depicted in FIG. 1 and denoted by the reference numeral 22. These circuits are usually connected by means of a cable 23 consisting of conductors 23A, 23B and 23C (FIG. 6A) to a signal generator UGK (FIG. 6A) comprising, in the example being described, a central control unit forming part of a data processing assembly. However, this signal generator may also consist of an electric coding keyboard actuated by hand by an operator. The signals which, generated by this signal generator UGK, are intended for the conversion means, are made up of groups of electric pulses, each of said groups being transmitted to the conversion apparatus by means of a cable 23C comprising, for example, eight conductors, the pulses of the same group being transmitted simultaneously but selectively to said conductors, so as to form a coded combination of signals representing a character. The characters which, represented by the coded combinations formed by said groups of pulses, are thus transmitted by means of the cable 23C are first stored in a buffer storage 50 comprising a number of locations equal to that of the groups of cells of the drum 10, each of said locations being provided to hold one character temporarily. In FIG. 6A, only four of these locations are shown for obvious reasons of simplification. It is assumed that said buffer storage 50 is a shift register, each of the characters contained in said shift register being automatically transferred from its location to the next location each time a character is extracted from said register, said transfer being effected in the direction of the location denoted by the reference numeral 50A. The storing into the locations of the buffer storage 50 of the characters transmitted sequentially by signal generator UGK is effected by a switching means 51 of known construction, which ensures the proper distribution of said characters in the successive locations of said storage 50 as these characters arrive. Each of the locations of the storage 50 comprises, in the example being described, eight positions, the first six of which are used to record the six binary digits of a coded combination representing one character, said coded combination being intended to form, in a manner which will be described hereinafter, a Braille character on the magnetic drum 10 and the seventh position which serves to contain a binary "1" which is associated with said coded combination each time that the Braille character which shall be formed on the drum 10 from said coded combination is the last of a line of Braille characters. The eighth position of each location is intended to contain a binary digit "1" which, associated with the last of the coded combinations recorded in the storage 50, serves to indicate the end of the text to be recorded, in the form of Braille characters, on the drum 10.

As may be seen and appreciated in FIG. 6A, the location 50A of the storage 50 is connected by means of a gate 56 placed under the control of a pulse generator GI, which will be discussed hereinafter, to a register 55. Said register 55 has a capacity equal to that of location 50A, that is to say, it has eight storage positions. Therefore, each time that, under conditions which will be explained further below, a pulse is sent by signal generator GI and is applied to the gate 56, the six binary digits contained in the first six positions of the location 50A are transferred to the first six positions of the register 55, while the two binary digits "0" or "1" contained in the last two positions of said locations are transferred to the last two positions of the register 55. The last two positions of the register 55 are connected to two detectors, one of which, DFL, is called detector of end of line, and the other detector, DFT, is called end-of-text detector. If, during the transfer to the register 55 binary digits contained in location 50A, a binary digit "1" is recorded in the seventh position of the register 55, the arrival of said digit at this position is detected by the detector DFL, which signals said arrival by delivering a positive voltage to its output SFL.

The detector DFL possesses a zero-reset input AFL and it is constructed in such a manner that the positive voltage it delivers to its output SFL continues to exist as long as a pulse has not been applied to said input AFL. Likewise, if, during the transfer to register 55 of the binary digits contained in location 50A of the storage 50 a binary digit "1" is recorded in the eighth position of the register 55, the arrival of said digit in said position is detected by the detector DFT, which signals said arrival by supplying a positive voltage to its output SFT. The detector DFT possesses a zero-reset input AFT, and it is constructed such that the positive voltage it delivers to its output SFT continues to exist as long as a pulse has not been applied to said input AFT.

Before describing all the operations that are triggered by the control unit as soon as the storing of the coded combinations into the buffer storage 150 is completed, a description will first be given of the circuits that allow each of the coded combinations contained in said storage to be extracted from said storage, then converted into another coded combination capable of selectively exciting the recording heads T-1 to T-n so that a character corresponding to said coded combination can be properly formed on the drum 10. Toward this end, each of these heads is connected, as can be seen in FIGS. 6B and 6C, by means of one of n conductors labeled W1, W2, . . . , Wn to the outputs of a storage unit 52 of known construction. Here, said unit 52 is simply indicated as being of the same type as that which has incidentally been described and illustrated in French Pat. No. 2,443,335 and which comprises a plurality of storage locations disposed in three rows J1, J2 and J3 and n columns, each of said columns being associated with one of heads T-1 to T-n, each of said storage locations being established in order to hold temporarily a binary digit necessary to control the excitation of a recording head. The binary digits contained in the storage unit 52 emanate from a transcoding storage 53 which is connected through three conductors B1, B2 and B3 to the three rows J1, J2 and J3 of storage locations of the unit 52. Said transcoding storage 53, whose structure will be indicated hereinafter, is in turn connected by means of control circuits, such as CA1, CA2 to the outputs SA, SB, . . . , SZ of a decoder 54, which is connected to the outputs of the register 55. The decoder 54 possesses as many outputs SA, SB . . . , SZ as there are possible types of Braille characters capable of being formed on the drum 10. This decoder 54 is established in a manner known in the prior art so as to apply to only one of its outputs a positive voltage as a result of the decoding of the coded combination contained in the first six positions of the register 55, said output being that which is associated with the character represented by said coded combination. Thus, for example, if the binary combination contained in the first six positions of the register 55 represents conventionally the character A, the output of the decoder 54, to which is applied a positive potential, is the output SA. Likewise, if said coded combination represents conventionally the character B, the output of the decoder 54 to which is applied a positive potential is the output SB, and so on. To each of the outputs of the decoder 54 there is connected a group of two control circuits. However, for reasons of simplification, in FIG. 6A only the two control cirucits CA1 and CA2 connected to the output SA as well as one, CB1, of the two control circuits CB1 and CB2 connected to the output SB are shown. The pulses sent by the pulse generator GI are applied not only to the gate 56 but also, by means of a delay element R1 to the conditioned inputs of those control circuits the reference of which terminates in 1 (i.e., circuits CA1, CB1, etc. . . . ). Thus, as can be appreciated in FIG. 6A, the delayed pulses appearing at the output of the delay element R1 are also applied by means of a delay element R2 to the conditioned inputs of those control circuits whose reference terminates in 2 (i.e., circuits CA2, CB2, etc. . . . ). Each of said control circuits CA1, CA2, CB1, etc... is connected through its output to one of the inputs of the mother storage 53. It is assumed here that said storage 53, in which 3-bit words are stored, is of the same type as that described in French Pat. No. 1,333,920, said storage comprising for the storing of N 3-bit words a group of three ferrite bars disposed in the same plane, parallel to each other, each of said bars being provided with a secondary multiturn winding and N primary windings extending in a direction perpendicular to said bars, each primary winding having single-turn couplings to some of said bars and being connected to the output of each one of the aforementioned control circuits, so that when any one of said primary windings is excited by a pulse transmitted by the control circuit connected to said winding, a voltage pulse will appear only at the terminals of the secondary windings of the bars that are coupled magnetically to said primary winding, said pulses representing binary digits "1" being transmitted to the storage unit 52 by means of conductors B1, B2 and B3. It will be understood that under these conditions—in response to a pulse sent by the generator GI and applied to the delay element R1—a delayed pulse appears at the output of said element R1. Said delayed pulse, applied to the input of the delay element R2 and to the conditioned inputs of the control circuits CA1, CB1, etc... causes the transmission to the conductors B1 to B3 of a first group of binary digits "1", after which the delayed pulse then appearing at the output of delay element R2 and applied to the conditioned inputs of the control circuits CA1, CB2, etc... causes the transmission to the conductors B1 to B3 of a second group of binary digits "1". A scanning chain 57 associated with the storage unit 52 enables said two groups of binary digits to be recorded in two consecutive columns of said unit 52. In this regard it is pointed out that said scanning chain, which is similar to that has incidentally been described in the aforementioned French patent application No. 2,443,335, advances with one step in the direction indicated by the arrow P in FIG. 6B each time it receives a pulse emitted either by the delay element R1 or by the delay element R2 and applied to the scanning chain 57 by means of a "0" circuit U1 and a delay element R3, as shown in FIGS. 6A and 6B. The structure of the transcoding storage 53 is such that the two groups of binary digits "1" which, in response to a pulse emitted by the generator GI, are thus recorded in two consecutive columns of storage unit 52, are distributed in the six storage locations of said two columns according to the same arrangement as that of the dots constituting the Braille character which is conventionally represented by the coded combination then stored in the first six positions of the register 55. Thus, for example, if said coded combination represents conventionally the letter t, the column of the storage unit 52, in which the first group of binary digits "1" sent by the storage 53 has been recorded, contains two binary digits "1" stored in the two positions which, in this column are situated in two rows J2 and J3, while the next column of unit 52 in which has been recorded the second group of binary digits "1" emitted by storage 53 contains two binary digits "1" stored in the two positions which, in said column, are in the two rows J1 and J2. When all of the binary digits "1" needed for the formation of a line of Braille characters on the drum 20 have thus been recorded in the storage unit 52, said binary digits are extracted from said unit 52, said binary digits are extracted from said unit 52, row by row, and sent in the form of pulses to the heaS T-1 to T-n by means of conductors W1 and Wn. The extraction of the binary digits "1" contained in unit 52 is triggered by electric pulses applied to different rows J1, J2 and J3 of unit 52, said pulses coming from three detectors PH1, PH2, PH3 disposed, as apparent from FIG. 6C, in the vicinity of a disk 58 secured to the shaft 13 of the drum 20. In the example being described, each of said detectors is formed by a photoelectric cell which generates an electric pulse each time it receives a light beam emitted by a luminous source (not shown) and passing through a hole, such as H1, of the disk 58. Toward this end, the disk 58 is provided with three series of holes, each series comprising a number of holes equal to that of the lines N1, N2, . . . , N3 of the drum, i.e., 31 holes in the example being described, the holes of the first series, such as H1 and H'1 illustrated in FIG. 6A being disposed around the shaft 13 in a first circle and being distributed on said circle in such a way that each of them lies straight above the row of cells L1 of each of the lines N1, N2,..., N31 of the drum 10. The detector PH1 is disposed such that when the drum 10 and the disk 58 turn, the holes of said first series move past it. Likewise, the holes of the second series, such as H2, are disposed in a second circle concentric with the first series and are distributed on said circle in such a manner that each of them lies straight above the row L2 of cells of each of the lines N1. N2, . . . N31, of the drum, the detector PH2 being placed so that, during the rotation of the drum, the holes of said second series move past it. Finally, the holes of the third series, such as H3, are disposed according to a third circle concentric with the preceding holes and are so arranged on said circle that each of them lies straight above the row L3 of the cells of each of lines N1, N2, . . . , N31, the detector PH3 being placed so that, during the rotation of the drum, the holes of said third series move past it. Under these conditions, each time that a row L1 of cells is about to pass under the heads T-1 to T-n, an electric pulse is delivered by the detector PH1 and applied to the first row J1 of the storage location of unit 52, causing the extraction of the binary digits "1" contained in said locations and their transmission, in the form of pulses, to the heads T-1 to T-n, the selective excitation of said heads being produced at the exact instant when said row L1 of cells passes thereabove. Likewise, each time that a row L2 of cells is about to pass under the heads T-1 to T-n, an electric pulse is delivered by the detector PH2 and applied to the second row J2 of storage locations of unit 52. The binary digits "1" stored in said locations are then extracted and transmitted in the form of pulses to the heads T-1 to T-n, the selective excitation of said heads being effected at the instant when said row L2 of cells passes therebelow. Finally, each time that a row L3 of cells is about to pass under said heads, an electric pulse is delivered by the detector PH3 and applied to the third row J3 of storage locations of unit 52. The binary digits "1" stored in said positions are then extracted and sent in the form of pulses to the heads T-1 to T-n, the selective excitation of said heads occurring at the instant when said row L3 of cells passes therebelow.

The principle of selective excitation of the heads T-1 to T-n having been described in detail, a description will now be given of the operations triggered by the control unit upon completion of the storing operation into the buffer storage 50 of the coded combinations sent by the signal generator UGK. Upon complete of said storing operation, the generator UGK indeed delivers an electric pulse which, transmitted by means of the conductor 23A, is applied, on the one hand, to a warning means 60, e.g., of the ringing kind, in order to advise the operator at the end of the storing operations into said storage unit 50 and, on the other hand, to the "normal" input of a trigger circuit BAC which then switched to the "1" state. Under these conditions, a positive voltage appears at the "normal" output of said trigger circuit BAC, said voltage then being applied to one of the three inputs of an AND circuit E1 (FIG. 6B). The two other inputs of said circuit E1 are connected to, respectively, the "supplementary" output of a trigger circuit BFM and to the "supplementary" output of a trigger circuit BVK. Since, as indicated hereinabove, said two trigger circuits BFM and BVK are in the "0" state, a positive voltage is present at the "supplementary" output of each of said two trigger circuits. Under these conditions, a positive potential is impressed upon the three inputs of the circuit E1 and, therefore, a positive voltage appears at the output of said circuit E1, rendering conductive a control circuit C1 whose conditioning input is connected to the output of the circuit E1. Moreover, it should be noted that the electric drive motor 11 of the drum 10 is connected to the terminals (+) and (−) of a current source by means of a contact CB controlled by a relay coil B. Since, initially, said coil B is not excited, the contact CB is open and, consequently, the motor 11 is not energized. Therefore, the drum 10 is immobile.

If, however, the operator presses a pushbutton KT, the positive voltage that has appeared at the "normal" output of the trigger circuit BAC is applied to the input of an amplifier-diverted AD-1 of known construction. This amplifier-diverter is set up to deliver an electric pulse to its output each time a positive potential is impressed upon its input. The electric pulse which is then supplied by said amplifier-diverter AD-1 is applied to the conditioned input of a control circuit C9 whose conditioning input is connected to the supplementary output of the trigger circuit BVK. Since said trigger circuit BVK is initially in the "0" state, a positive voltage is impressed upon the supplementary output of said trigger circuit, rendering the circuit C9 conductive. The pulse which, sent by AD-1, is transmitted by said circuit C9 is applied, on the one hand, by means of an OR circuit U2 to the "normal" input of a trigger circuit BET which then switches to the "1" state, and, on the other hand, by means of an OR circuit U3 to the zero-reset input of the scanning chain 57 so that the first group of binary digits, which will subsequently be sent by the storage 53, can be recorded in the first column of the unit 52, said first column being that to which is connected the conductor W1. Because of the fact that the trigger circuit BET is now in the "1" state, a positive voltage appears at the "normal" output of said trigger circuit and is applied to the coil B. The coil B, excited, closes its contact CB. Under these conditions, the motor 11 is energized by electric means and starts to turn, driving the drum 10 and the disk 58. During this rotation, the detectors PH1 to PH3 send pulses to the storage unit 52, but these pulses remain without effect, because this unit has not yet been charged. On the other hand, the pulses delivered by the detector PH3, in the course of this rotation, are also applied to the conditioned inputs of the two control circuits C2 and C3, the circuit C2 having its conditioning input connected to the output of an AND circuit E2, said circuit E2 having three inputs connected, respectively, to the supplementary output of the trigger circuit BAC, to the supplementary output of the trigger circuit BVK and to the supplementary output of the trigger circuit BFM. However, since the trigger circuit BAC is in the "1" state, no positive voltage appears at the output of the circuit E2 and, consequently, the control circuit C2 is not conducting. Likewise, the conditioning entry of the circuit C3 is connected to the output of an AND circuit E3. Said circuit E3 has three inputs which are connected to, respectively, the supplementary output of a trigger circuit BCE, which will be discussed hereinafter, to the supplementary output of a trigger circuit BPG, which will be explained further below and, finally, to the normal output of the trigger circuit BVK. However, since said trigger circuit BVK is in the "0" state, no positive voltage appears at the output of the circuit E3 and, consequently, the control circuit C3 is not conducting. Thus, the pulses coming from the detector PH3 and applied to the circuits C2 and C3 are blocked by them. The rotation of the drum 12 proceeds until the instant when the row L3 of cells of the last line N31 of the drum has just passed under the recording heads T-1 to N-n, said instant being detected by the movement of a tooth 59 of the disk 58 past a detector PHE conveniently placed on the periphery of said disk, said detector being of the type similar to the detectors PH1 to Ph3. The electric pulse which at that moment is delivered by the detector PHE is applied to the conditioned input connected to the "normal" output of the trigger circuit BFM. However, since said trigger circuit BFM is in the "0" state, no positive voltage is present at said normal output and, consequently, the circuit C4 is not conducting and thus blocks the pulse it receives. By contrast, since, as indicated hereinabove, the circuit C1 is conducting, the pulse which, senty by PHE, is applied to the conditioned input of said circuit C1 is transmitted by the latter and applied, on the one hand, by means of an OR circuit U4, to the supplementary circuit of the trigger circuit BET which thus switches back to the "0" state, and, on the other hand, by means of an OR circuit U5 to the normal input of a trigger circuit BCM which then switches to the "1" circuit. Said sme pulse is also applied to the supplementary input of the trigger circuit BACV which thus switches back to the "0" state. Since the trigger circuit BET is now in the "0" state, the coil B ceases to be excited and opens its contact CB, with the result that the motor 11 and the drum 10 are stopped. The latter is then stopped in such a position that the row L1 of cells of the first line N1 is the first to pass below the heads T-1 to T-n when, as will be seen further below, the drum 10 will again be driven by the motor 11. On the other hand, since the trigger circuit BAC is now in the "0" state, the three inputs of the circuit E2 are impressed with a positive voltage. Under these conditions, the output of sid circuit E2 has a positive potential, which renders the circuit C2 inoperative. However, since the circuit E1 no longer has all of its inputs impressed with a positive voltage, the positive voltage that until then existed at the output of said circuit disappears. Therefore, the circuit C1 becomes non-conducting. Since the trigger circuit BCM is now in the "1" state, a positive voltage appears at the normal output of said trigger circuit and is applied to the input of the pulse generator GI. The generator GI of known construction is constructed such as to deliver electric pulses, at regular intervals, as long as its inputs remains impressed with a positive voltage. The first pulse delivered by said generator is applied, on the one hand, to the input of the delay element R1, and on the other to the gate 56, triggering the transfer in the register 55 of eight binary digits stored in location 50A. As a result of the decoding effected by the decoder 54, one of the outputs of said decoder is impressed with a positive potential. The delayed pulse which, upon completion of said decoding, appears at the output of R1, is applied, on the one hand, to the input of the delay element R2 and, on the other hand, by means of the circuit U1, to the entry of the delay element R3. Said same pulse is also applied to the control circuits CA1, CB2, . . . , which, as explained hereinabove, causes the transmission by the storage 53 of a first group of binary digits "1" which, upon completion of said recording, appears at the output of R3 is applied to the scanning chain 57 so that the latter, by advancing one step in the direction of the arrow D, is positioned such as to enable the second group of binary digits, which will be sent by the storage 53, to be recorded in the second column of the unit 52. The delayed pulse which, upon completion of said positioning, appears at the output of R2 is applied, on the one hand, to the input of a delay element R4 and, on the other hand, by means of U1, to the input of R3. Said pulse is also applied to the control circuits CA2, CB2, . . ., which triggers the transmission, through the storage 53, of a second group of binary digits "1", said second group being recorded in the second column of the unit 52. Thereupon, the scanning chain 57 advances again one step under the effect of the delayed pulse which is sent thereto by the delay element R3. The delay pulse which then appears at the output R4 is applied to the conditioned inputs of two control circuites C5 and C6, the conditioning inputs of said circuits C5 and C6 being connected to, respectively, the output SFT of the detector DFT and to the output SFL of the detector DFL. In the case where no binary digit "1" is recorded in the last two positions of the register 55, neither of said two outputs SFT and SFL is impressed with a positive potential. In this case, the control circuits C5 and C6 are non-conducting and they block the pulse coming from the delay element R4. The second pulse which is then delivered by the pulse generator GI triggers operations similar to those that have just been described. It will be understood that, without repeating all the explanations that have been given above, said second pulse causes the recording of two other groups of binary digits "1" in the third and fourth columns of the unit 52, said digits being distributed in said two columns according to the same arrangement as that of the constituent dots of the Braille charactr represented by the coded combination stored in the first six positions of the register 55. As the generator GI delivers electric pulses, groups of binary digits "1" are also recorded in the successive columns of the unit 52. Said recording proceeds until the instant when, during the transfer to the register 55, of the binary digits stored in the location 50A a binary digit "1" is recorded in the seventh position of the register 55. At that moment, a positive voltage appears at the output SFL of the detector DFL and is applied to the conditioning input of the circuit C6 which then becomes operative. Said positive voltage is also applied to the input of an amplifier-diverter AD-2 which, since it is of a type similar to that of the amplifier-diverter AD-1, delivers a pulse. Said pulse is applied by means of an OR circuit U6 to the supplementary input of the trigger circuit BCM which thus switches back to the "0" state. Thereby, the normal output of this trigger circuit is no longer impressed with a positive potential and, hence, the generator GI ceases to deliver pulses.

The delay pulse which, upon completion of the recording of the last group of binary digits in the unit 52, appears at the output of the delay element R4, is applied to the circuits C5 and C6. Since the circuit C6 is now conducting, this pulse is transmitted by said circuit and applied, on the other hand, to the input AFL of the detector DFL, with the result that the positive voltage at the output SFL disappears and, on the other hand, by means of the circuit U3 to the zero-reset input EZ of the scanning chain 57. This pulse is also applied, by means of the circuit U2, to the normal input of the trigger circuit BET which then switches to the "1" state. Thereby, the coil B, re-energized, closes its contact CB. The motor 11 is then energized and begins to turn, carrying along drum 10 and the disk 58. Since, as indicated hereinabove, the the first row of cells which is about to pass under the heads T-1 and T-n is the row L1 of the line N1, the detector which, among the four detectors PHE and PH1 to PH3, will be the first to send a pulse is the detector PH1. Said pulse applied to the first row J1 of positions of the unit 52 triggers the extraction of the binary digits "1" stored in a few of said positions, said digits then being transmitted in the form of pulses to the heads T-1 to T-n which, as explained hereinabove, causes the magnetization of certain cells of said row L1. Likewise, the pulse which is then sent by the detector PH2 and which is applied to the row J2 of the unit 52, causes the selective magnetization of the cells of the row L2 of the line N1. Finally, the pulse which is then sent by the detector PH3 and which is applied to the third row J3 of positions of the unit 52 causes the selective magnetization of the cells of the row L3 of the line N1. At that moment, the cells of the three rows of the N1 of the drum 10 are selectively magnetized, so that, when these three rows then move past the trough 15, the magnetized cells of said rows will attract balls which then will form on the drum 10 of a group of raised dots that constitute a line N1 of Braille characters. The pulse which is sent by the detector PH3 is also applied, on the one hand, to the counting input ED of a count-down counter CDL, which will be discussed hereinafter, said counter being for the moment inactive, and, on the other hand, to the conditioned inputs of the circuits C2 and C3. Since, as indicated hereinabove, the circuit C2 is now conducting, said pulse is transmitted by the circuit C2 and applied, on the one hand, by means of U4, to the supplementary input of the trigger circuit BET which thus switches back to "0" and, and on the other hand, by means of U5 to the normal input of the trigger circuit BCM which then switches to "1". Under these conditions, the coil B is de-energized and opens its contact CB, so that the motor 11 is stopped, as well as the drum 10 in such a position that the row L1 of cells of the second line N2 will be the first to pass under the heads T-1 to T-n when the drum 10 will again be driven by the motor 11. It is pointed out that, since the triggr circuit BVK is in the "0" state, no positive voltage will appear at the output of the circuit E3. Under these conditions, the control circuit C3 is non-conducting and it thus blocks the pulse coming from the detector PH3.

Since the trigger circuit BCM is again in the "1" state, the generator GI again sends pulses. The operations which then take place are similar to those described hereinabove. Without entering into the details, it is simply indicated here that in the course of these operations the unit 52 is first charged, the groups of binary digits "1" delivered by the storage 53 being recorded in the various columns of said unit 52. Thereupon, the motor 11 is re-energized in order to drive the drum 10 and the disk 58. The three pulses delivered successively by the three detectors PH1, PH2 and PH3 in the course of this drive and applied to the rows J1, J2 and J3 of the unit 52 result in the selective magnetization of the cells of rows L1, L2 and L3 of line N2 of the drum, owing to which a second line N2 of Braille characters will be formed when these cells subsequently move past the trough 15. It is thus seen that through successive charging, then discharging operations of the unit 52, lines N1, N2, N3, etc. ... of Braille characters can be formed on the drum 10, said operations being repeated until the instant when, following a transfer to the register 55, of the binary digits stored in the location 50A, a binary digit "1" is recorded in the eighth position of the register 55. At that moment, a positive voltage appears at the output SFT of the detector DFT and is applied to the conditioning input of the circuit C5 which then becomes conducting. This positive voltage is also applied to the input of an amplifier-diverter AD-3 of a type similar to AD-1, which then delivers a pulse. This pulse is applied by means of U6 to the supplementary input of the trigger circuit BCM which then switches back to "0", causing the transmission of pulses by the generator GI to be stopped.

Upon completion of the recording of the last group of binary digits in the unit 52, the delayed pulse then appearing at the output of R4 is applied to the circuits C5 and C6. This pulse, transmitted by the circuit C5 which then becomes conducting, is applied, on the one hand, to the input AFT of the detector DFT, resulting in the disappearance of the positive voltage at the output SFT and, on the other hand, by means of U3, to the zero-reset input EZ of the scanning chain 57. This pulse is also applied on the one hand, to the normal input of the trigger circuit BFM, which then switches to "1", rendering the circuit 4 conductive, whereas the circuit C2 becomes non-conducting and, on the other hand, by means of U2, to the normal input of the trigger circuit BET, which thus switches to "1". This pulse is also transmitted by means of a conductor 23B to signal generator UGK in order to warn that storage 50 is now empty and is ready to receive another text. Since the trigger circuit BET is at "1", the coil B is energized and, closing its contact CB, causes the rotation of the drum 10 and of the disk 58. The three pulses which, in the course of this movement, are delivered successively by the three detectors PH1, PH2 and PH3, causes the selective magnetization of the cells intended for the formation of the last line of Braille characters. However, the pulse which, sent by PH3, is also applied to the circuits C2 and C3, is no longer transmitted by the circuit C2. Under these conditions, the drum 10 continues to be rotated by the motor 11. During this rotation, other pulses can be delivered by the detectors PH1, to PH3, but these pulses now remain without effect, since the unit 52 is no longer charged. When, during this rotation, the line N1 of Braille characters again is about to pass under the heads T-1 to T-n, a pulse is delivered by detector PHE and applied to circuits C1 and C4. Since only the circuit C4 is conducting, this pulse is transmitted by said circuit and applied, on the one hand, to the supplementary input of the trigger circuit BFM which thus switches back to "0" and, on the other hand, to a setting input EF of the count-down counter CDL. Each time that a pulse is applied to its input EF, said count-down counter CDL is so positioned that it contains a number Y representing the number of lines of the drum which must move past the opening 18 from the moment when the line N1 is on the heads T-1 to T-n so that said line N1 can arrive straight above said opening. The number which is thus placed in the count-down counter DCL then diminishes by one unit each time a pulse, coming from the detector PH3, is applied to its count-down input ED, i.e., each time a line of the drum has passed under the heads T-1 to T-n. Thus, it will be understood that, when this count-down counter has received through its input ED, Y pulses sent by the detector PH3, the contents of said count-down counter become zero, said phenomenon thus occurring shortly before the line N1 of Braille characaters arrives before the opening 18. The count-down counter CDL is set up to deliver a pulse to its output SDL as soon as its contents become zero. Said pulse is applied, on the one hand, to the normal input of the trigger circuit BVK, which then switches to the "1" state and, on the other hand, by means of an OR circuit U7 and the circuit U4, to the supplementary OR circuit U4 of the trigger circuit BET which thus switches back to "0". This de-energizes the coil B and, consequently, the drum 10 and the disk 58 stop, said stoppage occurring at the precise moment when the line N1 of Braille characters that has been formed on the drum arrives before the opening 18. Furthermore, the pulse that has been delivered by the count-down counter CDL and which has been transmitted by means of the circuit U7 is also applied to a second warning device 61 of the same type as the warning device 60 in order to advise the operator that a line of Braille characters, i.e., in this case the line N1, is immobilized before the opening 18. The operator, who has been so advised, can then, by running his fingers along the line N1, recognize the characters of said line. Thereupon, the operator can by pressing a pushbutton KL, bring the next line, i.e., the line N2, before the opening 18. Since the trigger circuit BVK is now at "1", pressing the pushbutton KL results in impressing the positive voltage that has appeared at the normal output of said trigger circuit upon the input of an amplifier-diverter AD-4 of a type similar to the amplifier-diverters AD-1 to AD-3 referred to above. The pulse which is then delivered by AD-4 is applied by means of U2 to the normal input of the trigger circuit BET. The trigger circuit BET then switchs to "1", causing the coil B to be energized and, thereby the drive of the drum 10 and the disk 58 by the motor 11. However, since the trigger circuit BVK is now at "1", no positive voltage appears at the output of E1 and E2 and, consequently, the circuits C1 and C2 are non-conducting. By contrast, since the three inputs of the AND circuit are now impressed with a positive potential, a positive voltage appears at the output of said circuit E3, rendering the circuit C3 conducting. On the other hand, since the trigger circuit BFM is now at "0", the circuit C4 is non-conducting. Under these conditions, the pulse which, at the instant when the row L3 of the line N1 is about to pass under the heads T-1 to T-n, is sent by detector PH3 and which is applied to circuits C2 and C3 is transmitted only by circuit 3. This pulse is then applied by means of U7 and U4 to the supplementary input of the trigger circuit BET, which switches back to "0", thereby causing the de-energization of B and the stoppage of the drum 10 and disk 58 said stoppage occurring exactly at the moment when the line N2 arrives before the opening 18. The pulse which is transmitted by means of U7 is also applied by means of U7 to the warning device 61 in order to advise the operator that said line N2 is now immobilized before the opening 18 and, in turn, can be identified by touch.

After the explanations given hereinabove, it will be understood that each time the operator, after identifying a line, presses the pushbutton KL, the drum 10 is momentarily driven in order to bring the next line opposite the opening 18. Upon completion of the identification of the various Braille characters, the operator, if he so desires, can control either the erasure lines of Braille characters formed on the drum or the recording of said lines, in the form of raised dots on a paper tape such as that which in FIG. 5 is denoted by 31, or also control the rereading of the lines of previously identified characters.

In the event the operator only wants to control the erasure of the lines of Braille characters of the drum, he must then press a pushbutton KF, causing the positive voltage delivered to the output of the trigger circuit BVK to be applied to the input of an amplifier-diverter AD-5. The latter then delivers a pulse which is applied, on the one hand, by means of an OR circuit U8 (FIG. 6C) to the input of a delay element R5 and to the normal input of the trigger circuit BCE which then switches to "1" and, on the other hand, by means of an OR circuit U9 (FIG. 6B) and of the circuit U2 to the normal input of the trigger circuit BET which thus switches to "1". In view of the fact that the trigger circuit BCE is now at "1", the circuit E3 ceases to have its three inputs impressed with a positive potential. Under these conditions, the positive voltage existing at the output of said circuit disappeared, rendering the circuit C3 non-conducting. On the other hand, the positive voltage which is then delivered to the normal output of the trigger circuit BCE is applied to an energizing source of the erasing means 21, so that the latter is then capable of ensuring the demagnetization of the cells which move past it. Moreover, since the trigger circuit BET is now at "1", the coil B is re-energized, which causes the drum 10 and the disk 58 to be driven by the motor 11. In the course of this drive, the cells of the drum move past the erasing means 21, enabling the cells that were magnetized to be demagnetized and the balls that were housed in said cells to be extracted therefrom. The delay of the delay element R5 is set up in such a way that—in response to pulse that was applied to its input—a delayed pulse appears at its output only when all the cells of the drum have moved at least once past the erasing means 21. Said delayed pulse is then applied, on the one hand, to the supplementary inputs of the trigger circuits BVK and BCE which thus switch back to "0" and, on the other hand, by means of U4 to the supplementary input of the trigger circuit BET which, since it switches back to "0", causes the stoppage of the drum 10. At that moment, the drum is ready to be reused to form new lines of Braille characters.

In the event the operator, after identifying the lines of Braille characters of the drum, wishes to control the recording of said characters on a paper tape 31, he must press a pushbutton KI, which enables the positive tension delivered to the normal output of the trigger circuit BVK to be applied to the input of an amplifier-diverter AD-6. The latter then delivers a pulse which is applied, on the one hand, to the normal input of the trigger circuit BPG which thus switches to "1" and, on the other hand, by means of U9 and U2 to the normal input of the trigger circuit BET which switches back to "1". However, before describing the operations triggered as a result of the switching operations of the trigger circuits BET and BPG, it is first pointed out that, as can be appreciated from FIG. 6C, the disk 58 is provided with a notch HR which, when said disk is rotated, moves past a detector PHR of a type similar to that of the detectors PH1 to PH3, said detector PHR delivering an electric pulse each time said notch HR moves past it. The detector PHR and the notch HR are positioned in such a manner that said detector delivers a pulse only at the instant when the line N1 of the drum is about to move past the pressure roller 32 which is now in the position of rest.

The detector PHR is connected through its output to the conditioned inputs of two control circuits C7 and C8, the circuit C7 having its conditioning input connected to the output of an AND circuit E4, the circuit C8 having its conditioning input connected to the output of an AND circuit E5. The circuit E4 possesses four inputs which are connected to, respectively, the normal output of the trigger circuit BPG, to the supplementary output of the trigger circuit BCE, to the normal output of the trigger circuit BVK, and to the supplementary output of a trigger circuit BIP. The circuit E5 possesses three inputs which are connected to, respectively, the normal output of the trigger circuit BVK, to the supplementary output of the trigger circuit BCE, and to the normal output of the trigger circuit BIP. The normal output of the trigger circuit BIP is likewise connected to the electromagnet 39 discussed hereinabove. Since the trigger circuit BIP is in the "0" state, no positive voltage is delivered to the normal output of said trigger circuit. Therefore, the electromagnet 39 is not energized. On the other hand, the output of the circuit E5 is not impressed with a positive potential, so the circuit C8 is not conducting.

A description will now be given of what happens when, after the operator presses the pushbutton K1, the trigger circuits BPG and BET have been switched to the "1" state. Owing to the fact that the trigger circuits BVK and BPG are in the "1" state and the trigger circuits BCE and BIP are in the "0" state, the output of the circuit E4 is impressed with a positive voltage. By contrast, the positive voltage which has until then energized the output of the circuit E3 disappears. Under these conditions, the circuit C7 is rendered conducting, while the circuit C3 becomes non-conducting. Furthermore, owing to the fact that the trigger circuit BET is now in the "1" state, the coil B is re-energized, triggering the drive of the drum 10 and of the disk 58 by the motor 11. In the course of this drive, although the detectors PHE and PH1 to PH3 deliver pulses, the latter remain without effect because of the fact that the unit 52 and the count-down counter CDL are no longer charged and the circuits C1, C2, C3 and C4 are non-conducting. By contrast, the pulse which, in the course of this drive, is delivered by the detector PHR and which is then applied to the conditioned inputs of the circuits C7 and C8 is transmitted by the circuit C7 and applied to the normal input of the trigger circuit CIP which then switches to "1". Therefore, the output of the circuit E4 ceases to be impressed with a positive voltage and, consequently, the circuit C7 becomes non-conducting. However, owing to the fact that the three inputs of the circuit are now at a positive potential, the output of said circuit E5 is impressed with a positive potential, and, consequently, the circuit C8 becomes conducting. Furthermore, since the trigger circuit BIP is at "1", the electromagnet 39 receives the positive voltage delivered to the normal output of the trigger circuit and it then displaces the lever 34 in order to bring the roller 32 and the paper tape 31 urged against the drum, said displacement occurring at the precise instant when the line N1 of Braille characters, which has been formed on the drum, is about to move past said roller 32. Under these conditions, the paper tape 31, squeezed between the drum 10 and the roller 32, is driven, while the raised dots formed by the balls housed in the magnetized cells of the drum cause, as they move past the roller 32, this paper tape to be embossed, so that the latter, when it breaks loose from its contact with the drum and with the roller, then emerges with raised dots that reproduce the image of the Braille characters of the drum. This embossing operation, also called printing operation, proceeds until the moment when, the line N1 of Braille characters of the drum being about to move past the roller 32 again, a pulse is delivered by the detector PHR. Said pulse, applied to the conditioned inputs of the circuits C7 and C8 is transmitted only by the circuit C8 which applies it to the supplementary inputs of the trigger circuits BPG and BIP, which thus switch back to "0". In the example being described, the transmitted pulse C8 is also applied by means of U8 to the normal input of the trigger circuit BCE, which, as described earlier, triggers the erasure of the lines of Braille characters from the drum, then, upon completion of the erasing operation, the resetting to the "0" state of the trigger circuits BCE, BVK and BET, the resetting to "0" of the trigger circuit BET, thereby causing the stoppage of the drum. However, in a variation of the invention, the pulse transmitted by C8 can only be applied to the supplementary inputs of the trigger circuits BPG and BIP. In this case, the operator can, if he so wishes, control at will new reading operations each time by pressing the button KL, or new operations for printing B characters on the paper tape 31 each time by pressing the button KI. However, as soon as all of these operations are completed, he should press the button KF in order to control the erasure of the lines of Braille characters of the drum. Indeed, the formation on the drum of new lines of Braille characters can only be effected after the previously formed lines of Braille characters have been erased.

While particular embodiments of the invention have been shown, it will be understood, of course, that the invention is not limited thereto, since many modifications may be made, and it is, therefore, contemplated to cover by the appended claims any such modifications as fall within the spirit and scope of the invention.

I claim:

1. Apparatus for converting electric signals representing data into a coded image of said data comprising a group of raised dots intended to be read by touch or recorded on a medium, said apparatus comprising a magnetic recording medium (10) having a surface capable of being magnetized locally at quasi point-shaped sites disposed in rows (L1, L2, L3) and columns (K1, K2), a recording unit (14) placed near said surface and operatively arranged to selectively magnetize said elementary sites of said medium in response to the reception of said electric signals, a drive (11) to bring about a relative displacement between said recording medium and said recording unit according to a preset direction of movement so as to enable said elementary sites to be selectively magnetized in the course of their movement past said recording unit, and an applicator means (15) downstream of said recording unit (14) in relation to said direction of movement for depositing on said recording medium (10) particles that are capable of being attracted magnetically, said magnetic recording medium (10) having a plurality of cells (12) each locally established in each of said elementary sites and adapted to receive a particle deposited by said applicator means (15) in the cells that have been magnetized, said particle being shaped so that the particles received at a site juts out at the surface of said recording medium.

2. The apparatus as set forth in claim 1, wherein the diameter of each particle is such that each cell (12) can receive only one particle.

3. The conversion apparatus as set forth in claim 1, wherein said magnetic recording medium (10) is comprised of a cylindrical block (28) of non-magnetic material and provided with a plurality of magnetic elements (29), each of said elements being disposed below each of said cells (12) and being composed of a magnetic material with a high residual magnetism.

4. The apparatus as set forth in claim 2, wherein each cell is defined at the surface of said recording medium by a circular contour (C) and has a depth p not exceeding $\frac{3}{4}$ of the diameter of said contour.

5. The conversion apparatus as set forth in claim 1, wherein each cell has the form of a cylindrical cavity whose axis is perpendicular to the surface of said recording medium and each said particle has a diameter slightly smaller than that of said cylinder so as to enable each said particle to find a place in a cell without friction against the walls thereof.

6. The conversion apparatus as set forth in claim 3, wherein the bottom of each cylindrical cavity is flat.

7. The conversion apparatus as set forth in claim 1, wherein each said cell has the form of a spherical cap whose depth satisfies the double inequation:

$$D/3 \leq P \leq D/2$$

and in that each said spherical cap has a diameter E resulting from:

$E = P + D2/4p.$

8. The conversion apparatus as set forth in claim 1, wherein each said particle has a diameter not exceeding three millimeters.

9. The conversion apparatus as set forth in claim 1, wherein said magnetic recording medium (10), has the form of a cylinder rotating about an axis (13), and further comprises a pressure roller (32) coated with a layer of elastic material (41) and mounted to turn freely on an axis of rotation (13) of said recording medium (10), said pressure roller (32) being normally set up to occupy a position of rest in which it is kept separate from said recording medium; and a control mechanism (34, 38, 39, 63) constructed and arranged such that, when acted upon, it urges said pressure roller (32) against said recording medium, thus enabling said spherical particles jutting out at the surface of said recording medium (10) to emboss a recording sheet (31) engaged between said medium and said pressure roller (32) during the rotation of said medium (10).

10. The conversion apparatus as set forth in claim 1, wherein said magnetic recording medium (10) is a cylinder mounted for rotation about a shaft (13) and said cells (12), being distributed on said medium so as to form, when spherical particles are received by said cells, groups of raised dots representing Braille characters.

11. The apparatus as set forth in claim 10 further comprising a case (17) in which said recording medium (10) is enclosed, said case having an opening (18) extending along said medium parallel to its axis of rotation (13) so as to enable an operator's fingers to come into contact with said medium and identify, by touch, the Braille characters that have moved past said opening.

12. The conversion apparatus as set forth in claim 1, in which said recording unit (14) comprises a row of n magnetic recording heads (T-1 to T-n) each associated with one of the n columns of cells (K1, K2, K3, ... ) of said recording medium (10), said apparatus further comprising:
  a storage unit (52) comprising storage locations each set up to temporarily hold a binary digit needed to control the magnetization of a cell (12) of said recording medium, said storage locations being disposed in three rows (J1, J2, J3) and n columns, each of said n columns being connected to each of said n magnetic recording heads;
  a register (55) set up to temporarily hold a combination of signals representing a Braille character to be formed on said recording medium (10); and
  a transcoding storage (53) connected, on one side, to said register (55) by means of a decoder (54) and, on the other side, to said storage unit (52) and set up in response to the recording of a combination of signals in said register (55) to deliver two groups of binary digits "1" to said storage unit (52), each of said two groups being recorded in each of said two consecutive columns of said unit, the arrangement of said binary digits "1" recorded in said six positions of said two columns being the same as that of the dots constituting the Braille character represented by the combination of signals contained in said register (55).

13. The conversion apparatus as set forth in claim 12, wherein said rows of cells of said recording medium (10) are distributed to form groups (N1, N2, N3, ... ) each comprising three rows of cells (L1, L2, L3), each group enabling the formation of a line of Braille characters.

14. The apparatus as set forth in claim 13 including electric control means further comprising:
  a first detection group (PH1, H1, H'1, ... ) set up to detect the movement of said first row (L1) of each group of cells past said recording heads (T-1 to T-n) and to send a pulse to said first row (J1) of storage locations of said storage unit (52) at the moment when said first row of cells (L1) is about to move past said heads;
  a second detection group (PH2, H2, ... ) set up to detect the movement of said second row (L2) of each group of
  a second detection group (PH2, H2, ... ) set up to detect the movement of said second row (L2) of each group of cells past said heads (T-1 to T-n) and to send a pulse to the second row (J2) of storage locations of said storage unit (52) at the moment when said second row of cells (12) is about to move past said head; and
  a third detection group (PH3, H3, ... ) set up to detect the movement of the third row (L3) of each group of cells past said heads (T-1 to T-n) and to send a pulse to the third row (J3) of storage locations of said storage unit (252) at the moment when said third row of cells (L3) is about to move under said heads, owing to which said binary digits "1" which, stored in the three rows (J1, J2, J3) of said storage unit (52) are extracted, row by row, under the action of the pulses applied to said rows are sent in the form of electric pulses in order to selectively energize said heads (T-1, T-n), thus causing the selective magnetization of said cells of the same group.

15. The conversion apparatus as set forth in claim 1 further comprising an erasing means (21) disposed near the surface of said magnetic recording medium (10) and operatively connected to demagnetize said cells (12) which move past during the displacement of said recordig medium (10) when said erasing means is energized.

16. The conversion apparatus as set forth in claim 15 further comprising an electromagnetic means (19) for extracting spherical particles disposed near the surface of said magnetic recording medium (10) and upstream of said erasing extraction means (21) relative to the direction of placement of said medium, said extraction means being arranged when energized to extract said particles received in said cells (12) which move past it in the course of said displacement of said medium.

* * * * *

UNITED STATES PATENT AND TRADEMARK OFFICE
CERTIFICATE OF CORRECTION

PATENT NO. : 4,500,293

DATED : February 19, 1985

INVENTOR(S) : Jean Jacques ELTGEN

It is certified that error appears in the above-identified patent and that said Letters Patent is hereby corrected as shown below:

Claim 1, column 22, line 35, change "particles" to --particle--;

Claim 7, column 23, line 1, "E=P+D2/4p" should be --$E=P+D^2/4p$--.

Signed and Sealed this

Seventeenth Day of September 1985

[SEAL]

Attest:

Attesting Officer

DONALD J. QUIGG

Commissioner of Patents and Trademarks—Designate